United States Patent
Subbarao et al.

(10) Patent No.: US 7,246,259 B2
(45) Date of Patent: Jul. 17, 2007

(54) METHOD OF CALCULATING PARITY FOR SURVIVING DUAL DRIVE FAILURES IN A DISK ARRAY

(75) Inventors: Sanjay Subbarao, Irvine, CA (US); Kenneth W. Brinkerhoff, Mission Viejo, CA (US)

(73) Assignee: Aristos Logic Coporation, Foothill Ranch, CA (US)

( * ) Notice: Subject to any disclaimer, the term of this patent is extended or adjusted under 35 U.S.C. 154(b) by 502 days.

(21) Appl. No.: 10/927,307

(22) Filed: Aug. 27, 2004

(65) Prior Publication Data

US 2005/0216787 A1 Sep. 29, 2005

Related U.S. Application Data

(60) Provisional application No. 60/553,984, filed on Mar. 18, 2004.

(51) Int. Cl.
*G06F 11/10* (2006.01)

(52) U.S. Cl. .................................. 714/6; 714/770
(58) Field of Classification Search .................... 714/6, 714/770
See application file for complete search history.

(56) References Cited

U.S. PATENT DOCUMENTS

| | | | |
|---|---|---|---|
| 5,351,246 A * | 9/1994 | Blaum et al. ............... | 714/6 |
| 6,453,428 B1 | 9/2002 | Stephenson | |
| 6,675,318 B1 | 1/2004 | Lee | |
| 6,694,479 B1 | 2/2004 | Murthy et al. | |
| 2003/0023809 A1* | 1/2003 | Oldfield et al. .............. | 711/114 |
| 2003/0126522 A1 | 7/2003 | English et al. | |
| 2003/0126523 A1 | 7/2003 | Corbett et al. | |
| 2003/0196023 A1* | 10/2003 | Dickson ........................ | 711/1 |
| 2004/0059958 A1* | 3/2004 | Umberger et al. ............. | 714/5 |
| 2005/0114729 A1* | 5/2005 | Nielsen et al. ................. | 714/7 |
| 2005/0160307 A1* | 7/2005 | Schmisseur .................... | 714/5 |
| 2006/0074995 A1* | 4/2006 | Hafner et al. ............... | 707/201 |

* cited by examiner

*Primary Examiner*—Stephen M. Baker
(74) *Attorney, Agent, or Firm*—Dickstein Shapiro LLP

(57) ABSTRACT

A disk array utilizes a surviving relationship algorithm for generating parity terms. During a drive failure, a script corresponding to the failure mode (e.g., single storage element failure or dual storage element failure) is executed. The script reconstructs data by deriving a surviving relationship matrix from a seed matrix, sending the resulting surviving relationship matrix to parity/data generators in the storage controller, and generating P parity and Q parity symbols based on the inputs from the relationship matrix. The surviving relationship matrix is independent of symbol position (i.e., row, column, or diagonal) and further ensures that all data is reconstructable after single or dual storage element failures.

20 Claims, 4 Drawing Sheets

METHOD OF CALCULATING PARITY FOR SURVIVING DUAL DRIVE FAILURES IN A DISK ARRAY

This application claims the benefit of U.S. Provisional Application Ser. No. 60/553,984, filed Mar. 18, 2004, the disclosure of which is herein incorporated by reference.

FIELD OF INVENTION

The present invention relates to storage devices. More specifically, the present invention relates to a method and apparatus for providing parity information capable for surviving dual drive failures in a disk array.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives because of their speed and reliability. However, fibre channel drives are very costly. Integrated drive electronics (IDE) drives are much cheaper in terms of dollars-per-gigabyte of storage; however, their reliability is inferior to that of fibre channel drives. Furthermore, IDE drives require cumbersome 40-pin cable connections and are not easily replaceable when a drive fails. Serial advanced technology attachment (SATA) drives that use the same receptor as their fibre channel counterparts are now available. These drives, therefore, have the speed required for acceptable system performance and are hot-swappable, meaning that failed drives are easily replaced with new ones. Furthermore, they provide more storage than do fibre channel drives and at a much lower cost. However, SATA drives still do not offer the same reliability as fibre channel drives. Thus, there is an industry push to develop high-capacity storage devices that are low cost and extremely reliable.

To improve data reliability, many computer systems implement a redundant array of independent disk (RAID) system, which is a disk system that includes a collection of multiple disk drives that are organized into a disk array and managed by a common array controller. The array controller presents the array to the user as one or more virtual disks. Disk arrays are the framework to which RAID functionality is added in functional levels to produce cost-effective, highly available, high-performance disk systems.

In RAID systems, the data is distributed over multiple disk drives to allow parallel operation, and thereby enhance disk access performance and provide fault tolerance against drive failures. Currently, a variety of RAID levels from RAID level 0 through RAID level 6 have been specified in the industry. RAID levels 1 through 5 provide a single drive fault tolerance. That is, these RAID levels allow reconstruction of the original data, if any one of the disk drives fails. It is quite possible, however, that more than one SATA drive may fail in a RAID system. For example, dual drive failures are becoming more common as RAID systems incorporate an increasing number of less expensive disk drives.

To provide, in part, a dual-fault tolerance to such failures, the industry has specified a RAID level 6. The RAID 6 architecture is similar to RAID 5, but RAID 6 can overcome the failure of any two disk drives by using an additional parity block for each row (for a storage loss of 2/N). The first parity block (P) is calculated by performing an exclusive or (XOR) operation on a set of positionally assigned data sectors (e.g., rows of data sectors). Likewise, the second parity block (Q) is generated by using the XOR function on a set of positionally assigned data sectors (e.g., columns of data sectors). When a pair of disk drives fails, the conventional dual-fault tolerant RAID systems reconstruct the data of the failed drives by using the parity sets. The RAID systems are well known in the art and are amply described, for example, in *The RAIDbook, 6th Edition: A Storage System Technology Handbook*, edited by Paul Massiglia (1997), which is incorporated herein by reference.

An example dual parity algorithm is found in U.S. Pat. No. 6,453,428, entitled, "Dual-drive fault tolerant method and system for assigning data chunks to column parity sets." The '428 patent describes a method of and system for assigning data chunks to column parity sets in a dual-drive fault tolerant storage disk drive system having N disk drives, where N is a prime number. Each of the N disk drives is organized into N chunks, such that the N disk drives are configured as one or more N×N array of chunks. The array has chunks arranged in N rows from row 1 to row N and in N columns from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$, where m is an integer that ranges from 1 to N. For row 1 of a selected N×N array, a first data chunk is assigned to a column parity set $Q_i$, wherein i is an integer determined by rounding down (N/2). For each of the remaining data chunks in row 1, each data chunk is assigned to a column parity set $Q_j$, wherein j is an integer one less than the column parity set for the preceding data chunk and wherein j wraps to N when j is equal to 0. For each of the remaining rows 2 to N of the selected array, a first logical data chunk is assigned to a column parity set $Q_k$, wherein k is one greater than the column parity set for the first logical data chunk in a preceding row and wherein k wraps to 1 when k is equal to (N+1). For each of the remaining data chunks in rows 2 to N, each data chunk is assigned to a column parity set $Q_n$, wherein n is an integer one less than a column parity set for the preceding data chunk and wherein n wraps to N when n is equal to 0.

The algorithm described in the '428 patent safeguards against losing data in the event of a dual drive failure. However, performing the algorithm described uses excess processing cycles that may otherwise be utilized for performing system storage tasks. Hence, the '428 patent describes a suitable dual parity algorithm for calculating dual parity and for restoring data from a dual drive failure, yet it fails to provide an optimized software system that is capable of performing the dual parity algorithm without affecting system performance. Furthermore, the algorithm described in the '428 patent is dependent on row and column parity, which may not be the most efficient algorithm for every parity update. There is, therefore, a need for an effective means of calculating parity, such that the storage system is fault tolerant against a dual drive failure, provides optimal performance by an algorithm that runs a priori, and, further, is capable of generating parity regardless of symbol position (i.e., not dependent on row, diagonal/column parity).

It is therefore an object of the invention to provide an algorithm that compensates for dual-storage element failures in a networked storage system.

It is another object of this invention to provide an algorithm that compensates for dual-storage element failures in a networked storage system and that is not dependent on symbol position.

It is yet another object of this invention to provide an algorithm that compensates for dual-storage element failures in a networked storage system and that runs once a priori.

SUMMARY OF THE INVENTION

The present invention is an apparatus and method of calculating dual parity that compensates for one or two storage element failures in a networked storage system with n number of storage elements by evaluating all possible combinations of single and dual storage element failures in the array and calculating a surviving relationship from which to calculate the missing data and/or update parity. The method enables efficient calculation of updated parity symbols for every write operation. Unlike most RAID 6 dual parity calculation algorithms, which use row symbol and column symbol parity (or diagonal symbol parity), the apparatus and method described in the present invention works independently of symbol positions and is, therefore, more versatile.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 2:
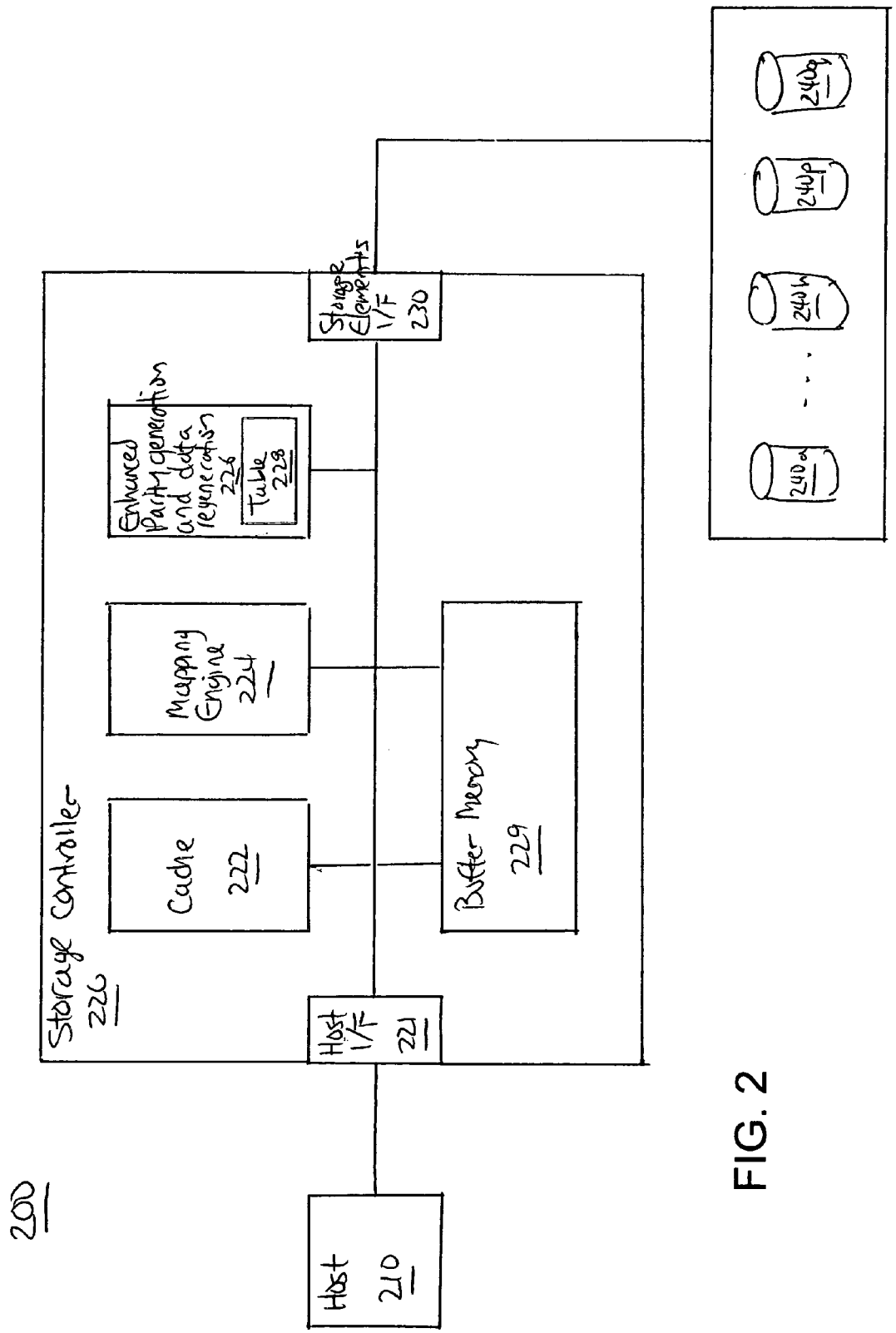
FIG. 2 illustrates a dual parity generation and data recovery system.

Now referring to the drawings, where like reference numerals designate like elements, there is shown in FIG. 2 a dual parity generation and data recovery system 200 that includes at least one host 210, a storage controller 220, and a plurality of storage elements 240. Storage controller 220 further includes a host interface 221, a cache 222, mapping engine 224, an enhanced parity generation and data regeneration system 226, which also includes a table 228, a buffer memory 229, and a storage elements interface 230. Host 210 is representative of any kind of mechanism that requests data reads and writes to and from storage elements 240, which may be any type of networked storage system, for example, a fibre channel or SCSI. Individual storage elements 240 may be, for example, SATA or fibre channel drives. Mapping engine 224 is a transaction processor entity that translates all host 210 requests for specific volumes into the actual logical block addresses (LBAs) in storage elements 240 for storage controller 220. Storage controller 220 may be, for example, the integrated I/O controller described in U.S. application Ser. No. 09/716,195. The storage controller 220 may further include the scalable transaction processing pipeline described in U.S. application Ser. No. 10/429,048. Both of these applications are hereby incorporated by reference.

The scripts in table 228 are generated by a method 100 (FIG. 1) when the storage system 200 is powered on. The method 100 will be described in greater detail below. Each line of the script specifies the list of locations of the resolved symbols in buffer memory 229 which are to be XOR-ed to recover a missing symbol and the location where the recovered missing symbol (result of XOR's) is to be saved.

The number of scripts are contiguously located in table 228 and is representative of the number of possible storage element 240 failures. In one exemplary embodiment, the storage elements 240 are organized in an 8+2 configuration. That is, there are eight storage elements 240a through 240h for data storage and two storage elements 240p and 240q for parity storage. The parity are organized into two different types of parity, namely a P parity and a Q parity.

The number of possible storage element failure combinations is $^nc_2 + ^nc_1$, where n is the number of storage elements. In the above described exemplary embodiment, the number of storage element failure combinations is fifty-five. However, it should be recognized that the present invention is not limited to a storage system utilizing a 8+2 configuration. For example, the present invention may also be practiced in a 16+2 storage element configuration, in which there are 163 combinations of storage element failures.

Each script corresponds to a particular storage element(s) failure(s), including single and dual storage element failures. For example, script one may correspond to a single failure by storage element 240a, and script fifty-five may correspond to a dual failure by storage elements 240p and 240q. These examples are provided for illustration only, and it will appreciated by one skilled in the art that the script number is arbitrarily assigned to a storage element failure or combination of failures.

In the event of single or dual storage element failure(s), storage controller 220 determines which storage element failure case is applicable. Mapping engine 224 determines the LBAs of the corresponding storage element 240 (240p, 240q and 240a-240h) for the corresponding volume and host 210 LBAs. For cases where no storage elements 240 have failed and a write operation is requested, mapping engine 224 specifies the offset (start of the relevant script) in table 228 for the script that corresponds to a dual failure by storage elements 240p and 240q, as this is the script for rebuilding the parity data stored on storage elements 240p and 240q. This script is executed by enhanced parity generation and data regeneration system 226. Each script also has an end of script command, so that script execution terminates at the end of the correct script and before the beginning of the next contiguous script.

Before describing write (FIG. 3) and read (FIG. 4) operations, it is useful to describe the P and Q relationships. First, an exemplary implementation of the P and Q relationships with respect the storage system 200 having storage elements 240 organized as an 8+2 system will be described. Then, the method 100 (FIG. 1) for creating the P and Q relationships when the storage system 200 is powered up will be explained.

Table 1 is an example of solution set of P and Q relationships which permit recovery of all symbols from any two storage element failure in an exemplary storage system 200 utilizing an 8+2 configuration. The P relationships are seeds for generating the Q relationships.

TABLE 1

| | | | P Relationships | | | | | | | | | Q Relationships | | | | | | | | |
|---|---|---|---|---|---|---|---|---|---|---|---|---|---|---|---|---|---|---|---|---|
| | | | | drives | | | | | | | | | | drives | | | | | | |
| | | 0 | 1 | 2 | 3 | 4 | 5 | 6 | 7 | | P | | 0 | 1 | 2 | 3 | 4 | 5 | 6 | 7 | | P | Q |
| | 0 | a | p | o | n | m | l | k | J | 0 | i | | 0 | B | A | A | A | A | A | A | A | 0 | I | A |
| | 1 | b | a | p | o | n | m | l | k | 1 | j | | 1 | C | C | B | B | B | B | B | B | 1 | J | B |
| | 2 | c | b | a | p | o | n | m | l | 2 | k | | 2 | D | D | D | C | C | C | C | C | 2 | K | C |
| | 3 | d | c | b | a | p | o | n | m | 3 | l | | 3 | E | E | E | E | D | D | D | D | 3 | L | D |
| s | 4 | e | d | c | b | a | p | o | n | 4 | m | s | 4 | F | F | F | F | F | E | E | E | 4 | M | E |
| y | 5 | f | e | d | c | b | a | p | o | 5 | n | y | 5 | G | G | G | G | G | G | F | F | 5 | N | F |
| m | 6 | g | f | e | d | c | b | a | p | 6 | o | m | 6 | H | H | H | H | H | H | H | H | 6 | O | G |
| b | 7 | h | g | f | e | d | c | b | a | 7 | p | b | 7 | I | I | I | I | I | I | I | I | 7 | P | H |
| o | 8 | i | h | g | f | e | d | c | b | 8 | a | o | 8 | J | J | J | J | J | J | J | J | 8 | A | I |
| l | 9 | j | i | h | g | f | e | d | c | 9 | b | l | 9 | K | K | K | K | K | K | K | K | 9 | B | J |
| s | 10 | k | j | i | h | g | f | e | d | 10 | c | s | 10 | L | L | L | L | L | L | L | L | 10 | C | K |
| | 11 | l | k | j | i | h | g | f | e | 11 | d | | 11 | M | M | M | M | M | M | M | M | 11 | D | L |
| | 12 | m | l | k | j | i | h | g | f | 12 | e | | 12 | N | N | N | N | N | N | N | N | 12 | E | M |
| | 13 | n | m | l | k | j | i | h | g | 13 | f | | 13 | O | O | O | O | O | O | O | O | 13 | F | N |
| | 14 | o | n | m | l | k | j | i | h | 14 | g | | 14 | P | P | P | P | P | P | P | P | 14 | G | O |
| | 15 | p | o | n | m | l | k | j | i | 15 | h | | 15 | | | | | | | | | 15 | H | P |

In Table 1, the P relationships are diagonal because any symbol and its diagonally adjacent (upper left or lower right) symbol XOR to zero. For example, using the symbol "^" to represent the XOR operation, D[d,s] to represent a data storage element symbol where d represents a storage element number and s represents a symbol number, and P[s] and Q[s] respectively represent the P parity and the Q parity storage elements, it can be seen in Table 1 that P[8]^D[0,0]^D[1,1]^D[2,2]^D[3,3]^D[4,4]^D[5,5]^D[6,6]^D[7,7]=0. This example relationship represents the P relationship denoted in Table 1 as "a". Additionally, the number of symbols of each relationship equation is less than or equal to the number of drives in the networked storage system 200. In Table 1, the number of terms in the XOR equation of each relationship is equal to the number of storage elements in the system plus the P parity symbol, which is nine.

This examplary method of calculating dual parity for a networked storage system assumes that each block of data in a storage element (represented by a column in Table 1) is a group of sixteen symbols. A symbol may be an arbitrary number of bytes, a word, a portion of a sector, or a block of sectors. Although these values have been incorporated for ease of understanding, it should be appreciated by one skilled in the art that other values of symbol groups which represent a storage element and other symbol lengths may be used without deviating from the spirit and scope of the invention.

The P relationships are a simple set of relationships between the symbols of storage elements and one symbol from the P parity storage element where each individual relationship is $P_n$. Each $P_n$ includes one symbol from each data storage element and one symbol from the P storage element; and each non-Q storage element symbol is in one, and only one, $P_n$. There are no relational requirements, such as horizontal, diagonal, or adjacent positions of symbols which are required by other algorithms. In the example in Table 1, there are sixteen individual $P_n$ relationships. The number of relationship equations is equal to the number of symbols in a column. For this example, there are sixteen relationship equations. No two relationships have a symbol in common and each relationship has one symbol from each data storage element and one symbol from the P parity storage element.

The Q relationship set is derived from the P relationship set. The individual relationships within the Q relationship set are defined as $Q_n$. Each $Q_n$ includes a symbol from the P parity storage element and a symbol from the Q parity storage element and one symbol from all storage elements but one data storage element. Each storage element symbol is in at most one $Q_n$.

For any two storage element failures, 32 symbols are removed from two columns in Table 1. A surviving relationship has only one symbol that is unknown: Any relationship that has no unknown symbols is called an intact relationship, and relationships that have two unknowns are called non-surviving relationships. By generating symbols from surviving relationships, more surviving relationships are created from non-surviving relationships. By selecting a set of Q relationships that satisfies the state where all lost symbols can be regenerated (i.e. no data is lost) even if two storage elements fail. From the example in Table 1, Q[0]^D[1,0]^D[2,0]^D[3,0]^D[4,0]^D[5,0]^D[6,0]^D[7,0]^P[8]=0 is an individual $Q_n$ relationship, "A", that all storage elements except D[0].

TABLE 2

| | | | P Relationships drives | | | | | | | | | | | | Q Relationships drives | | | | | | | | | | |
|---|---|---|---|---|---|---|---|---|---|---|---|---|---|---|---|---|---|---|---|---|---|---|---|---|---|
| | | | 0 | 1 | 2 | 3 | 4 | 5 | 6 | 7 | P | | | 0 | 1 | 2 | 3 | 4 | 5 | 6 | 7 | | P | Q |
| | 0 | n | b | m | d | m | g | f | k | | 0 | b | 0 | O | D | P | H | A | M | M | B | 0 | B | A |
| | 1 | c | i | p | a | b | n | i | h | | 1 | m | 1 | D | K | B | E | G | C | P | P | 1 | M | B |
| | 2 | h | p | c | n | g | e | l | e | | 2 | h | 2 | I | A | F | A | L | K | B | M | 2 | H | C |
| | 3 | m | g | f | k | l | l | o | b | | 3 | c | 3 | N | I | I | O | | A | E | J | 3 | C | D |
| s | 4 | b | n | i | h | a | c | b | c | | 4 | n | s 4 | C | P | L | L | F | I | I | F | 4 | N | E |
| y | 5 | g | e | l | e | f | j | e | l | | 5 | i | y 5 | H | G | O | I | K | P | L | C | 5 | I | F |
| m | 6 | l | l | o | b | k | a | h | i | | 6 | d | m 6 | M | N | A | F | P | G | O | | 6 | D | G |
| b | 7 | a | c | b | o | p | h | k | f | | 7 | o | b 7 | B | E | E | B | D | N | A | N | 7 | O | H |
| o | 8 | f | j | e | l | e | o | n | c | | 8 | i | o 8 | G | L | H | P | J | D | D | K | 8 | J | I |
| l | 9 | k | a | h | i | j | f | a | p | | 9 | e | l 9 | L | C | K | M | O | L | H | G | 9 | E | J |
| s | 10 | p | h | k | f | o | m | d | m | | 10 | p | s 10 | | J | N | J | C | B | K | D | 10 | P | K |
| | 11 | e | o | n | c | d | d | g | j | | 11 | k | 11 | F | | | G | I | J | N | A | 11 | K | L |
| | 12 | j | f | a | p | i | k | j | g | | 12 | f | 12 | K | H | D | C | N | | | O | 12 | F | M |
| | 13 | o | m | d | m | n | b | m | d | | 13 | a | 13 | P | O | G | | B | H | C | L | 13 | A | N |
| | 14 | d | d | g | j | c | i | p | a | | 14 | l | 14 | E | F | J | N | H | O | F | I | 14 | L | O |
| | 15 | i | k | j | g | h | p | c | n | | 15 | g | 15 | J | M | M | K | M | E | J | E | 15 | G | P |

Table 2 is an example of a random P relationship set and the derived Q relationship set. Table 2 utilizes the same notation as previously described with respect to Table 1. Thus, it can be seen in Table 2 that $Q[0]\char`\^D[1,2]\char`\^D[2,6]\char`\^D[3,2]\char`\^D[4,0]\char`\^D[5,3]\char`\^D[6,7]\char`\^D[7,11]\char`\^P[13]=0$ is one individual $Q_n$ relationship, "A", in the Q relationship set.

The method for calculating surviving relationships uses the P relationship set shown in Table 2 as a seed for deriving the Q relationship set. The resulting parity symbols ensure data integrity regardless of any combination of dual storage element failures.

Figure 1:
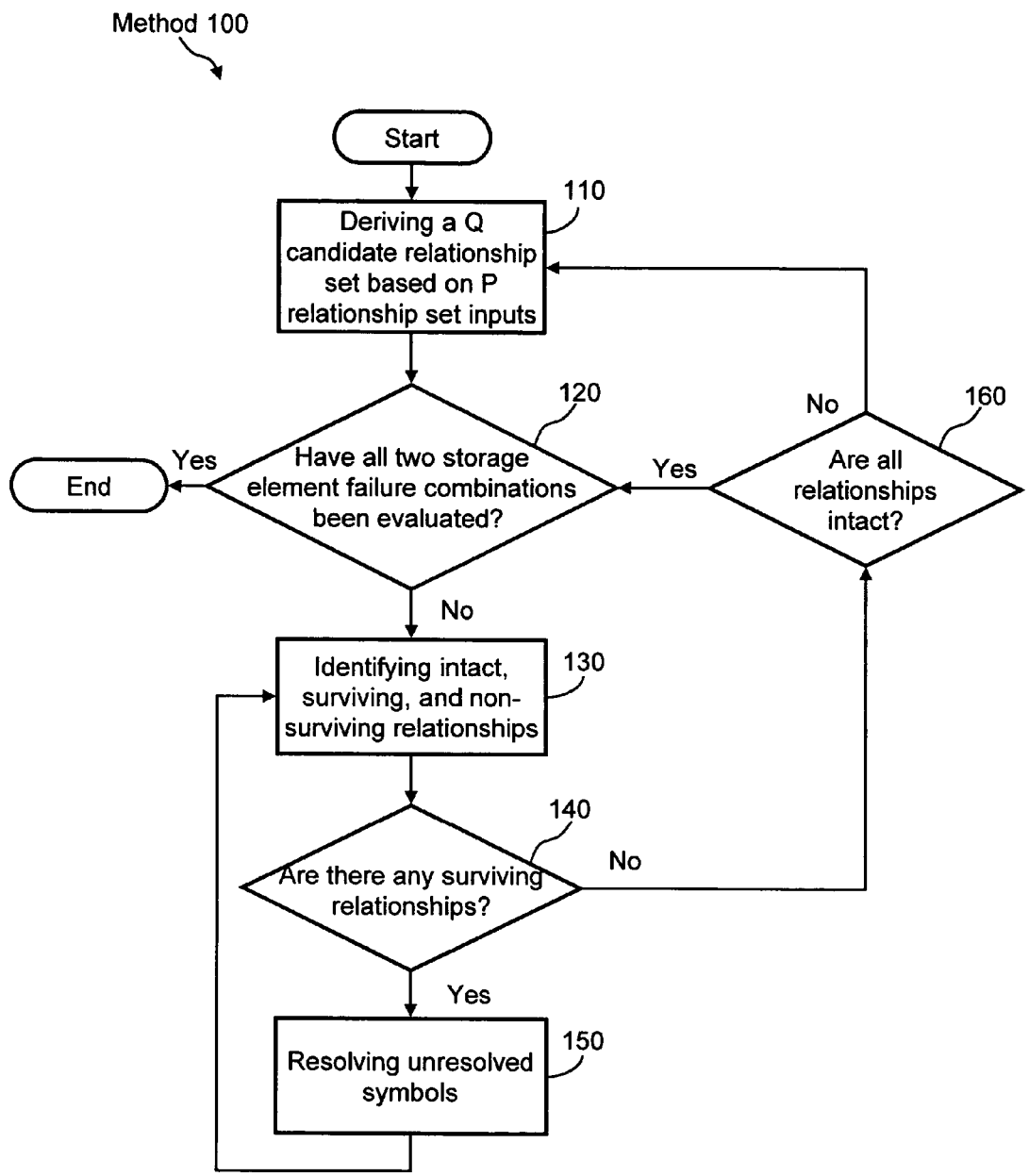
FIG. 1 is a flow diagram of a method of deriving surviving relationships in a networked storage system.

Now referring to FIG. 1, the method 100 of deriving surviving relationships in a networked storage system 200 can be explained. Method 100 includes the following steps:

Step 110: Deriving a Candidate Q Relationship Set Based on P Relationship Set Inputs In this step, method 100 derives a candidate Q relationship set from a P relationship seed. The symbols in the Q relationships are randomly selected from the Q parity storage element symbols, the P parity storage element symbols, and one symbol each from all but one data storage element. No two Q relationships miss the same data storage element, and no two Q relationships have a common symbol between them. This process repeats until there are as many Q relationships as the number of symbols per column (in the previous example there are sixteen). Method 100 proceeds to step 120.

Step 120: Have all two storage element failure combinations been evaluated?

In this decision step, method 100 determines whether all two storage element failure combinations have been evaluated for this candidate Q relationship set (i.e. can all unresolved symbols be resolved for all failure combinations?). If yes, method 100 ends and this Q candidate relationship set is designated as the Q relationship set; if no, initially un-resolved symbols for the next two storage element failure combination are identified (32 unresolved symbols are created in any two storage element failure combinations in the 8+2 example) method 100 proceeds to step 130.

Step 130: Identifying Intact, Surviving, and Non-surviving Relationships for the Given Set of Unresolved Symbols In this step, for the given set of unresolved symbols, method 100 identifies intact relationships, surviving relationships, and non-surviving relationships. These relationships include both P and Q relationship sets. Method 100 proceeds to step 140.

Step 140: Are there any surviving relationships?

In this decision step, method 100 determines whether there are any surviving relationships. If yes, method 100 proceeds to step 150; if no, method 100 proceeds to step 160.

Step 150: Resolving Unresolved Symbols

In this step, method 100 expresses the unknown term as an XOR equation of resolved symbols. For example, if D[1,2] in Table 2 is an unknown term, it can be resolved by using the following XOR equation:

$$D[1,2]\char`\^=Q[0]\char`\^D[2,6]\char`\^D[3,2]\char`\^D[4,0]\char`\^D[5,3]\char`\^D[6,7]\char`\^D[7,11]\char`\^P[13]$$

Therefore, D[1,2] is resolved and becomes a known term. It should be clear to one skilled in the art that this particular step illustrates a single resolution, however, multiple resolutions are possible if there are more surviving relationships. The set of unresolved symbols is updated to remove the newly resolved symbol (e.g. D[1,2] for this example). Method 100 returns to step 130.

Step 160: Are all relationships intact?

In this decision step, method 100 determines whether all the relationships are intact. If yes, method 100 determines that this candidate Q relationship set is the correct set with which to generate parity and/or data for this particular two storage element failure combination and method 100 returns to step 120; if no, method 100 returns to step 110.

Method 100 runs on any computer and generates a plurality of scripts corresponding to each failure case. For each failure case (single and dual) evaluated for a successful Q candidate, the XOR equations needed to resolve all missing symbols are written out to a disk file as a script.

Now that the P and Q relationships have been explained, the write and read operations of the storage system 200 are described below.

Figure 3:
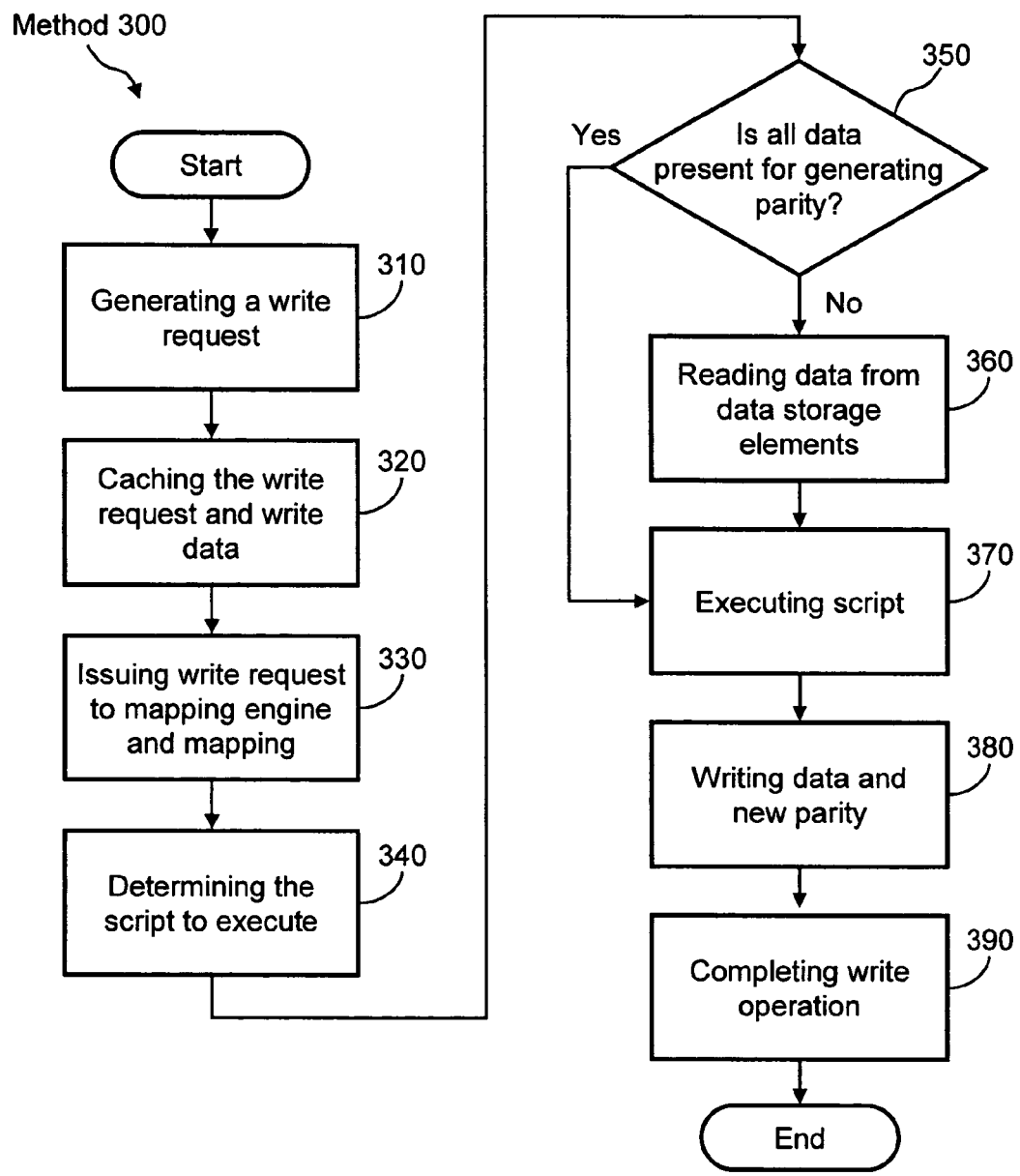
FIG. 3 is a flow diagram of method of dual parity calculation for a write operation.

Referring to FIGS. 2 and 3, in a write operation, host 210 generates a write request to storage controller 220. Cache 222 stores the write request and write data. Cache 222 sends a request to mapping engine 224 to flush the relevant data in buffer memory 229 to storage elements 240. Mapping engine 224 determines that storage elements 240p and 240q need to be updated as a result of the write operation. Mapping engine 224 specifies the script (table 228 offset) that needs to be executed by enhanced parity and data regeneration system 226 for generating the updated 240p and 240q parity data. Enhanced parity and data regeneration system 226 executes the commands for the specified script in table 228 until the end of the script is reached. The result is updated P parity and Q parity symbols in buffer memory 229. Storage controller 220 flushes the updated P and Q parity to storage elements 240p and 240q respectively. Host 210 data is also flushed from buffer memory 229 to the corresponding storage. elements 240a-240h. Finally, storage controller 220 sends a "done" signal to host 210, which completes the write operation.

FIG. 3 is a flow diagram of method 300 of dual parity calculation for a write operation. Method 300 includes the following steps:

Step 310: Generating a Write Request

In this step, host 210 generates a write request to a specific volume that corresponds to particular data sectors of storage elements 240 (240a through 240h). Storage controller 220 receives the write command from host 210 and sends the command to cache 222. Method 300 proceeds to step 320.

Step 320: Caching the Write Request and Write Data

In this step, cache 222 stores the write request and write data from host 210. Method 300 proceeds to step 330.

Step 330: Issuing Write Request to Mapping Engine and Mapping

In this step, cache 222 issues a write request to mapping engine 224. Mapping engine 224 determines the storage elements and corresponding LBA ranges, that are affected by the host 210 command and also allocates space in buffer memory 229 for holding computed parity and other read data (needed for computing parity): Method 300 proceeds to step 340.

Step 340: Determining the Script to Execute

In this step, mapping engine 224 analyzes the write request to determine which storage elements 240 failure combination case is applicable. For this example, it is assumed that all storage elements 240 are functional. Therefore, mapping engine 224 determines that storage elements 240p and 240q should be updated with new parity and sends the corresponding script offset (in table 228) and location of data (needed to compute parity) and parity (where the Xor operation results are to be stored in buffer memory 229) to enhanced parity and data regeneration system 226. Method 300 proceeds to step 350.

Step 350: Is all data present for generating parity?

In this decision step, mapping controller 224 determines if all data required to generate the new P and Q parity is present in buffer memory 229. If yes, method 300 proceeds to step 370; if no, method 300 proceeds to step 360.

Step 360: Reading Data from Data Storage Elements

In this step, mapping engine 224 issues read commands to the storage element 240 controllers (not shown) to read the relevant data (that which is required to compute P and Q parity, but was not part of host 210 data) from data storage elements 240. Method 300 proceeds to step 370.

Step 370: Executing the Script

In this step, enhanced parity and data regeneration system 226 executes the commands of the script located at the given table 228 offset and continues until it reaches the end of script command. The result is new P and Q parity symbols located in buffer memory 229. Method 300 proceeds to step 380.

Step 380: Writing Data and New Parity

In this step, storage controller 220 flushes relevant data in buffer memory 229 to corresponding storage elements 240. Storage element 240 controllers (not shown) write the host 210 write data (in buffer memory 229) to corresponding data storage elements 240a through 240h, the new P parity to storage element 240p, and the new Q parity to storage element 240q. Method 300 proceeds to step 390.

Step 390: Completing Write Operation

In this step, storage controller 220 sends a done signal to host 210, once the write command has completed (i.e., data has been written and dual parity has been updated). Method 300 ends.

Figure 4:
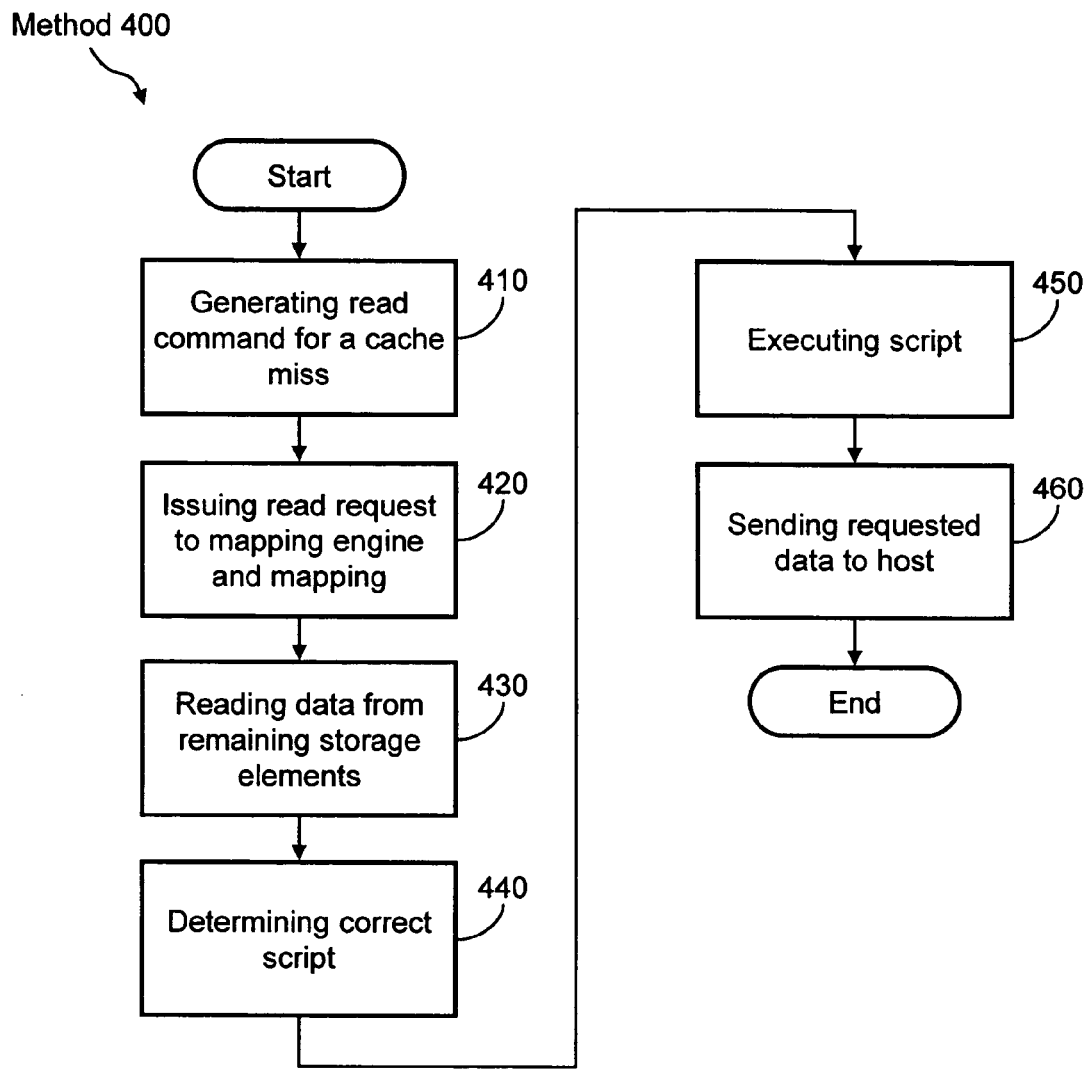
FIG. 4 is a flow diagram of a method of data regeneration from dual parity for a read operation with missing data.

FIG. 4 is a flow diagram of a method 400 of data regeneration from dual parity for a read operation with missing data, for example, a cache miss read operation that includes missing data from dead storage elements 240c and 240f. Method 400 includes the following steps:

Step 410: Generating Read Command for a Cache Miss

In this step, host 210 generates a read command for data from a specific volume that corresponds to particular data sectors of storage elements 240 (240a through 240h). Controller 220 receives the read command from host 210 and sends the command to cache 222. Cache 222 determines that the host command is a cache miss. Method 400 proceeds to step 420.

Step 420: Issuing Read Request to Mapping Engine and Mapping

In this step, cache 222 issues a read request to mapping engine 224. Mapping engine 224 determines which storage elements 240 corresponding LBA ranges need to be read to satisfy the host 210 command and also allocates space in buffer memory 229 for holding parity and other data needed for regenerating missing data. Method 400 proceeds to step 430.

Step 430: Reading Data from Remaining Storage Elements

In this step, mapping engine 224 issues read commands to the storage element 240 controllers (not shown) to read the relevant data from remaining functional storage elements 240, including storage elements 240p and 240q into buffer memory 229. Method 400 proceeds to step 440.

Step 440: Determining Correct Script

In this step, mapping engine 224 translates the storage elements 240c and 240f failures to a corresponding table 228 script and passes the script offset and location of data and parity (read from storage element 240) in buffer memory 229 to enhanced parity and data regeneration system 226. Method 400 proceeds to step 450.

Step 450: Executing the Script

In this step, enhanced parity and data regeneration system 226 executes the script in table 228 (mapping engine 224 specifies an offset location in table 228, which is the start of the script). Enhanced parity and data regeneration system 226 regenerates the missing data for storage elements 240c and 240f from the remaining data (relevant data from functional storage elements 240 including 240p and 240q) in buffer memory 229 and stores the regenerated data in buffer memory 229. Method 400 proceeds to step 460.

Step 460: Sending Requested Data to Host

In this step, storage controller 220 sends the requested data, including the reconstructed data, to host 210 from buffer memory 229. Method 400 ends.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A storage system, comprising:
   N storage elements, organized as (N−2) storage elements for storing data, a storage element for storing a P parity, and a storage element for storing a Q parity, said N storage elements storing at least one block comprising a group of M symbols from each of said N storage elements, N being an integer greater than 3 and M being an integer greater than 1;
   a storage controller for controlling a data transfer between said N storage elements and at least one host, said storage controller comprising:
      a host interface for coupling said storage controller to at least one host;
      a storage element interface for coupling said storage controller to said N storage elements;
      a buffer memory for temporarily storing a block of symbols associated with symbols from said data transfer, said block of symbols comprising M sets of N symbols, each of said M sets including at least one data symbol, a P parity symbol, and a Q parity symbol; and
      a parity system, for maintaining said P parity symbols, said Q parity symbols, and for regenerating missing symbols in said block of symbols from up to two failed storage elements of said N storage elements;
   wherein
      said parity system calculates each P parity symbol in said block using a first relationship including said P parity symbol and (N−2) data symbols from each one of (N−2) storage elements which stores data, such that each data symbol in said block is associated with only one P parity symbol, and no two first relationships in said block share a common symbol; and
      said parity system calculates each Q parity symbol in said block using a second relationship including said Q parity symbol, one of said P parity symbol, and (N−3) data symbols from all but one of said (N−2) storage elements which store data, such that no two second relationships in said block miss a same data symbol and no two second relationships in said block share a common symbol.

2. The storage system of claim 1, wherein said parity system comprises:
   a table for storing K scripts;
   wherein
      K is equal to a total number of possible single and double storage element failures in said storage system,
      each script provides parameters for said parity system to reconstruct any missing symbols, and
      each script is associated with a different one of said K potential single or double storage element failures.

3. The storage system of claim 1, wherein said storage controller further comprises
   a mapping engine for mapping between host asserted addresses to storage element. addresses.

4. The storage system of claim 1, wherein said storage controller further comprises
   a cache memory.

5. The storage system of claim 1, wherein N is equal to 10.
6. The storage system of claim 1, wherein N is equal to 16.
7. The storage system of claim 1, wherein M is equal to 16.
8. The storage system of claim 1, wherein said host interface is a fibre channel interface.

9. The storage system of claim 1, wherein each of said storage elements is a disk.

10. The storage system of claim 9, wherein said each of said storage elements is a serial advanced attachment (SATA) disk.

11. A method for operating a storage system having N storage elements organized as (N−2) data storage elements, a P parity storage element for storing P parity, and a Q parity storage element for storing Q parity, the storage system being organized into at least one block, each block having M symbols from each of said N storage elements, the method comprising:
   creating a set of P parity relationships for respectively calculating a set of P parities in a block, each P parity relationship including one P parity symbol in said block, and one data symbol in said block from each of said (N−2) data storage elements, such that no data symbol in said block is associated with more than one P parity relationship and none of the P parity relationships in said block share any common symbol;
   creating a set of Q parity relationships for respectively calculating a set of Q parities in said block, each Q parity relationship including one Q parity symbol in said block, one P parity symbol in said block, and (N−3) data symbols from all but one of said (N−2) data storage elements, such that none of the Q relationships in said block miss a common data symbol and none of the Q parity relationships in said block share any common symbols; and
   storing said set of P parity relationships and said set of Q parity relationships.

12. The method of claim 11, wherein said step of creating a set of Q parity relationship comprises:
   deriving a candidate Q parity relationship by selecting one unused P parity symbol and (N−3) data symbols respectively from all but one of said (N−2) storage elements which store data symbols;
   evaluating whether adding said candidate Q parity relationship to said set of Q parity relationship would permit reconstructing all missing symbols arising from every combination of single and double failures in said N data storage elements to be resolved;
   if said step of evaluation determines that all missing symbols can be reconstructed, adding said candidate Q parity relationship to said set of Q parity relationships;
   if said step of evaluation determines that all missing symbols cannot be reconstructed,
      repeatedly, until there are no longer any surviving relationships:
         identifying all intact, surviving, and non-surviving relationships for one group of missing symbols; and
         if said step of identifying yields at least one surviving relationship, resolving an unresolved symbol associated with one of said at least one surviving relationship;
      determining whether all relationships are intact;
      if all relationships are intact, continuing at said step of evaluating; and
      if not all relationships are intact, continuing at said step of deriving a Q parity relationship.

13. The method of claim 11, wherein said step of storing comprises:
   generating a set of scripts from said set of P parity relationships and said set of Q parity relationships; and
   storing said set of scripts;

wherein each script in said set of scripts is associated with a different one of a potential single or potential double storage element failure of said storage system.

14. The method of claim 13, wherein said set of scripts comprise a plurality of scripts respectively associated with every possible potential single or potential double storage element failure of said storage system.

15. The method of claim 11, further comprising:
receiving a write request, said write request including a host address and a write data;
mapping said host address to a storage element address;
identifying a P parity relationship and a Q parity relationship corresponding to said write data;
determining whether all symbols required to compute an updated P parity symbol and a Q parity symbol are available in said block;
if said step of determination determines that all symbols are not available, reading all missing symbols from said storage elements;
calculating an updated P parity symbol and an updated Q parity symbol based on the identified P parity relationship and Q parity relationship; and
writing said write data as at least one write symbol said updated P parity symbol, and Q parity symbol to said N storage elements.

16. The method of claim 15, further comprising storing said write data in a cache memory.

17. The method of claim 15, further comprising signaling completion of said write request.

18. The method of claim 11, further comprising:
receiving a read request, said read request including a host address;
mapping said host address to a storage element address;
reading, from said N storage elements, at said storage element address;
identifying a P parity relationship and a Q parity relationship corresponding to said read request;
regenerating any missing data symbols associated with said read request based on the identified P parity relationship and Q parity relationship; and
transmitting data symbols associated with said read request.

19. The method of claim 18, further comprising caching at least some of said data symbols associated with said read request.

20. The method of claim 18, further comprising caching regenerated data symbols associated with said read request.

* * * * *